March 5, 1940. W. J. HALL 2,192,309
MOLDING AND FASTENING MEANS THEREFOR
Filed Sept. 14, 1938
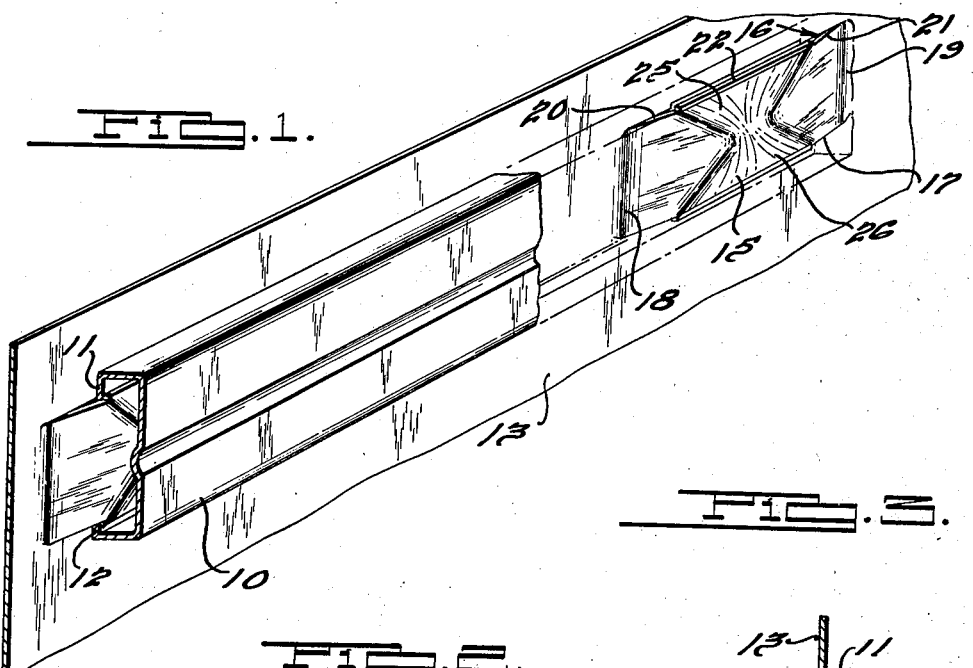
INVENTOR
William J. Hall.
BY
Harness, Dickey & Pierce
ATTORNEYS.

Patented Mar. 5, 1940

2,192,309

UNITED STATES PATENT OFFICE 2,192,309

MOLDING AND FASTENING MEANS THEREFOR

William J. Hall, Detroit, Mich.

Application September 14, 1938, Serial No. 229,817

5 Claims. (Cl. 189—88)

The invention relates generally to molding and it has particular relation to a fastening means for holding the molding in place.

While it is realized that molding is and has been applied by different means, such means insofar as known are open to objections for one or more reasons. Where separate fastening elements or members are employed the objection raised is that the procedure is more expensive because more parts are required and more time is necessary to assemble them and apply the molding. Where such fastening elements or members are not used and the molding is applied to a supporting surface by means of inter-engaging portions, at least one objection raised is that the inter-engaging portions are difficult to fabricate. Objections also are made to protruding parts which interfere with finishing or painting of the surface prior to application of the molding, and to the possibility of looseness occurring.

One object of the present invention is to provide a very simple means for fastening molding in place which may form a part of the surface or member upon which the molding is applied.

Another object of the invention is to provide an improved fastening means which permits application of the molding by a simple manual operation requiring only a small amount of pressure and which at the same time eliminates any assembling of separate fastening elements such as commonly employed.

Another object of the invention is to provide an improved fastening means which from the practical point of view, does not present any undesirable projections on the surface to which the molding is applied so as to thereby eliminate undesirable interference with surface finishing operations.

Another object of the invention is to provide improved fastening means which practically prohibit removal of the molding by any ordinary pulling operation so as to thereby insure retention of the molding in place.

Another object of the invention is to provide improved fastening means which are of such character that they permanently maintain their form and position so as to thereby provide a durable and tight mounting.

Other objects of the invention will become apparent from the following specification, from the drawing to which it relates, and from the claims hereinafter set forth.

For a better understanding of the invention reference may be had to the accompanying drawing, forming a part of the specification, wherein:

Figure 1 is a fragmentary view, partly broken away, illustrating a panel or supporting surface having molding applied thereto according to one form of the invention.

Fig. 2 is a plan view, partly broken away, of one of the fastening means illustrated in Figure 1.

Fig. 3 is a cross-sectional view taken substantially along the line 3—3 of Fig. 2.

Fig. 4 illustrates another construction embodying the invention, wherein the plate or surface upon which the molding is applied, is in turn applied to another surface.

Fig. 5 is a cross-sectional view taken substantially along the line 5—5 of Fig. 4.

Referring to Figs. 1 and 3, a channel shaped molding is indicated at 10 and while it may be constructed of various materials, it is suitable to construct it of thin stainless steel. It will be observed that the side legs of the molding terminate in inwardly directed flanges 11 and 12. The panel upon which the molding is mounted is indicated at 13 and such panel may constitute part of an automobile body or other construction upon which molding may be applied for ornamental purposes. The molding is fastened to the panel by means of outwardly struck tabs 15 disposed in spaced relation along the panel and each of these tabs is formed by cutting through the metal in the panel at each side as indicated at 16 and 17 so that the tab is connected to the panel only at its ends as indicated at 18 and 19. It will be observed that each side edge of the tab is cut to provide opposed end edge portions 20 and 21 that are in alignment and an intermediate edge portion 22 which is laterally offset a slight amount from the portions 20 and 21. From this it follows that the body of the tab intermediate its ends is slightly wider than such ends.

In fabricating the tab, the cut is formed along each side edge and the metal is pushed outwardly from the panel only a slight amount and the wider edges 22 are disposed in parallel relation to the panel and are spaced from the surface of the panel only an amount slightly greater than the thickness of the flanges 11 and 12 of the molding. This spacing is to be sufficient to permit the flanges to move under the edges 22 without difficulty while avoiding any undesirable looseness which would permit noise. It may be noted also that the lateral distance across the tab between the edges 22 is only slightly greater than the distance between the inner edges of the flanges 11 and 12, while the lateral distance across each of the end portions is substantially equal to the distance between the inner edges of the flanges.

While the edges 22 are substantially parallel to the plane of the panel, the intermediate body portion of the tab is provided with oppositely inclined portions 25 and 26 that lead to such edges. The end portions of the tab are tapered approximately from the ends of the edges 22 to the integral connections with the panel so that the edges 20 and 21 may be slightly angled with respect to the panel. It is to be observed that the tabs project only slightly from the plane of the panel and that they therefore do not constitute unsightly or interfering projections on the panel.

The molding is applied to each tab by pushing it toward the panel so that the edges of the flanges 11 and 12 on the molding ride downwardly over the edges 22 on the tab, it being understood that the surfaces 25 and 26 facilitate this movement of the flanges and that only a small amount of pressure is required to cause sufficient lateral separation of the flanges as to permit snapping of the edges of the flanges under the edges 22. After the flanges 11 and 12 snap under the edges 22 the resiliency of the molding naturally returns the flanges to their original position and when so returned, the edges of the flanges contact the edges 20 and 21 at each side of the tab. Thus lateral looseness of the molding is prevented by this contact while engagement of the flanges under the edges 22 prevents removal of the molding away from the panel. It is evident after the molding is applied to the tabs, that it will be very difficult to remove it without causing distortion of the molding in an abnormal manner. It would not be difficult to remove the molding if the flanges could be spread apart but since the flanges are against the panel, there is no access to the flanges.

The arrangement shown by Figs. 4 and 5 employs substantially the same principle insofar as fastening the molding is concerned, and the principal difference between the two arrangements is that the molding is mounted on a strip 30 which may be applied to a panel or other surface 32. This strip may be provided with openings 31 for receiving screws adapted to fasten the strip to any supporting surface. In order that the molding may be brought into substantial contact with the panel or other surface 32, the side edge portions of the molding may be deflected as indicated at 33 so as to substantially conceal the side edges of the strip 30 and also to bring the side edges of the molding substantially against the surface or panel 32. Thus insofar as appearance is concerned the molding will seem to be applied directly to the surface in the same manner as the construction disclosed in Figs. 1 and 3.

The invention is very advantageous because the molding may be manufactured substantially in the usual manner and thus no involved manufacturing operations are required. As for the fastening tabs, it is evident that they may be formed by very simple operations employing punches and dies that shape and deflect the tab and cut through the metal to form the side edges thereof. It may be observed that the shape of the tab increases its rigidity so that the edges and in particular the edges 22, are not easily bent or deflected with respect to the panel or strip with which they are connected. Thus even though considerable pressure is employed in snapping the molding over the edges 22, such edges maintain their positions and do not flex or bend toward the panel in such manner as to prevent the flanges of the molding moving under such edges. This is important for the reason that it is important to maintain the distance between such edges and the panel as little as possible while still permitting snapping of the flanges thereunder, and if the edges would flex easily, it would be necessary to initially at least have a larger separation of the edges and panels to insure movement of the flanges of the molding thereunder. By having the rigidity described, the edges 22 may be maintained very closely to a minimum separation from the panel without danger of being flexed into positions too close to the panel to prevent movement of the flanges of the molding thereunder. Application of the molding may be effected in a simple manner by applying manual pressure as previously described and due to the fact that the lateral distance between the edges 22 is very little greater than the lateral distance between the flanges 11 and 12, only a slight separation of the flanges is required to permit the snapping of the molding into place. It may be observed further that looseness is prevented by the engagement of the flanges with edges 20 and 21, by a close fit under edges 22 and by frictional contact between the flanges and the panel.

Although more than one form of the invention has been described and illustrated in detail, it will be apparent to those skilled in the art that various modifications may be made without departing from the scope of the appended claims.

What is claimed is:

1. In combination, a plate, a molding adapted to be fastened to the plate, and means for fastening the molding to the plate comprising a linear section thereof severed from the plate along the two opposed side edges and joined to the plate at the ends of the section, said section having side portions pressed outwardly from one surface of the plate so as to provide edge portions slightly spaced from said surface, the molding having edge portions engaging under the latter edge portions, the section being arched longitudinally and laterally to increase its resistance to bending or further displacement.

2. In combination, a plate, a molding adapted to be fastened to the plate, and means for fastening the molding to the plate comprising a linear section thereof severed from the plate along the two opposed side edges and joined to the plate at the ends of the section, said sections having side portions pressed outwardly from one surface of the plate so as to provide undercut edge portions slightly spaced from said surface and also having abutment portions leading to said surface and which are laterally spaced less than the undercut edge portions, the molding having edge portions engaging under the undercut edge portions of the section and abutting the abutment edge portions of the section, the section having inclined surfaces leading to the undercut edge portions so as to facilitate snapping edge portions of the molding under such undercut edge portions.

3. In combination, a plate, a molding adapted to be fastened to the plate, and means for fastening the molding to the plate comprising a linear section thereof severed from the plate along the two opposed side edges and joined to the plate at the ends of the section, said section having side portions pressed outwardly from one surface of the plate so as to provide undercut edges slightly spaced from said surface, the molding having edge portions engaging under the undercut edges of the section, said section also having laterally inclined surfaces leading to the undercut edges so as to facilitate snapping edge portions of the molding under such undercut edges.

4. In combination, a plate, a molding generally of C-shape and having inturned edges, and means for fastening the molding to the plate comprising a linear section thereof severed from the plate along the two opposed side edges and joined to the plate at the ends of the section, said section having its intermediate portion pressed outwardly from one surface of the plate in such manner that the side edges of such intermediate portion are substantially parallel to the plate but are spaced sufficiently therefrom to allow the edges of the molding to project under said side edges, the end portions of the section at the ends of the intermediate portion being narrower than the latter to allow the edges of the molding to project under the edges of the intermediate portion, said intermediate portion having inclined surfaces leading to its side edges so as to facilitate snapping the edges of the molding thereunder.

5. In combination, a plate, a C-shape molding adapted to be fastened to the plate, and means for fastening the molding to the plate comprising a linear section thereof severed from the plate along the two opposed side edges and joined to the plate at the ends of the section, said section having its intermediate portion pressed outwardly from one surface so as to provide undercut side edges that are parallel to the surface of the plate and spaced therefrom sufficiently to allow the edges of the molding to fit closely thereunder, the end portions of the section being narrower than the intermediate portion and being tapered gradually from the intermediate portion to the ends of the section, said intermediate portion having inclined surfaces leading to the undercut edges so as to facilitate snap-on engagement of the molding therewith.

WILLIAM J. HALL.